United States Patent
Lu

(10) Patent No.: US 10,362,175 B2
(45) Date of Patent: Jul. 23, 2019

(54) NETWORK TELEPHONE DEVICE, EXTERNAL CONNECTION CARD AND COMMUNICATION METHOD THEREFOR

(71) Applicant: Wistron Corporation, New Taipei (TW)

(72) Inventor: Li-Chun Lu, New Taipei (TW)

(73) Assignee: Wistron Corporation, New Taipei (TW)

( * ) Notice: Subject to any disclaimer, the term of this patent is extended or adjusted under 35 U.S.C. 154(b) by 100 days.

(21) Appl. No.: 15/679,167

(22) Filed: Aug. 17, 2017

(65) Prior Publication Data

US 2018/0309877 A1 Oct. 25, 2018

(30) Foreign Application Priority Data

Apr. 21, 2017 (TW) .............................. 106113458 A

(51) Int. Cl.
*H04L 12/66* (2006.01)
*H04M 7/00* (2006.01)
(Continued)

(52) U.S. Cl.
CPC ............ *H04M 7/006* (2013.01); *H04L 12/10* (2013.01); *H04M 1/2535* (2013.01); *H04M 3/005* (2013.01)

(58) Field of Classification Search
CPC .... H04M 7/006; H04M 1/2535; H04M 3/005; H04L 12/10
See application file for complete search history.

(56) References Cited

U.S. PATENT DOCUMENTS 7,206,874 B2 * 4/2007 Lee ..................... G06F 13/4027
710/100
7,627,002 B1 * 12/2009 Andrade ............. H04L 12/4625
340/333
(Continued)

FOREIGN PATENT DOCUMENTS

CN 105610586 5/2016
CN 207232946 4/2018

OTHER PUBLICATIONS

"Office Action of Taiwan Counterpart Application", dated Jul. 10, 2018, p. 1-p. 8.

*Primary Examiner* — Clemence S Han
(74) *Attorney, Agent, or Firm* — JCIPRNET

(57) ABSTRACT

A network telephone device, an external connection card, and a communication method therefor are provided. The network telephone device includes a controller, a network connection port, a network transmission module and a relay. The relay is coupled between the controller and at least two of a plurality of pins of the network connection port. While an external network cable connected to the network connection port is not capable of supplying power over Ethernet (POE) or a power supply mode of the POE is a first mode of the POE, the relay connects a transmit node and a receive node of the controller to the at least two of the pins respectively. The controller and an external device connected to the external network cable transmit signals compatible with a universal asynchronous receiver/transmitter (UART) interface to transmit data or instructions with each other through the at least two of the pins of the network connection port.

10 Claims, 3 Drawing Sheets

(51) Int. Cl.
*H04L 12/10* (2006.01)
*H04M 1/253* (2006.01)
*H04M 3/00* (2006.01)

(56) References Cited

U.S. PATENT DOCUMENTS

| | | | | |
|---|---|---|---|---|
| 2005/0097369 | A1* | 5/2005 | Bowser | H04L 12/10 |
| | | | | 713/300 |
| 2007/0168596 | A1* | 7/2007 | Hall | H04L 12/10 |
| | | | | 710/313 |
| 2007/0170909 | A1* | 7/2007 | Vorenkamp | G06F 1/266 |
| | | | | 324/76.11 |
| 2011/0252277 | A1* | 10/2011 | Peng | G06F 11/3656 |
| | | | | 714/38.1 |
| 2015/0156089 | A1* | 6/2015 | McCleland | H04L 43/08 |
| | | | | 307/1 |
| 2016/0210136 | A1* | 7/2016 | Huang | G06F 8/65 |

* cited by examiner

NETWORK TELEPHONE DEVICE, EXTERNAL CONNECTION CARD AND COMMUNICATION METHOD THEREFOR

CROSS-REFERENCE TO RELATED APPLICATION

This application claims the priority benefit of Taiwan application serial no. 106113458, filed on Apr. 21, 2017. The entirety of the above-mentioned patent application is hereby incorporated by reference herein and made a part of this specification.

BACKGROUND OF THE INVENTION

1. Field of the Invention

The invention relates to a detection technology for a telephone device, and particularly relates to a network telephone device capable of transmitting signals compatible with a universal asynchronous receiver/transmitter (UART) interface via a wired network connector (e.g., an RJ45 connector), an external connection card, and a communication method for the network telephone device and an external device.

2. Description of Related Art

Under the consideration of the appearance and the size of the conventional consumers' electronic products or functional electronic products, except for those corresponding to necessary functions, the manufacturers have been attempting to reduce other input/output connection ports as much as possible, so that the appearance of the product may be compact and desirable, and the hardware cost may be reduced. Taking a network telephone device (e.g., an IP phone) as an example, except for a network connector (e.g., an RJ45 port) for network data transmission and for being powered over the Ethernet (POE), the network telephone device theoretically does not require any other connection ports.

However, when the network telephone device is under development or the network function of the system in the network telephone device is abnormal and thus requires debugging, since the network telephone device is not provided with a connection port (e.g., a universal asynchronous receiver/transmitter (UART) interface or an R232 interface implemented with an RJ42 port) specifically disposed for debugging, the system information in the network telephone device is not accessible, or the firmware of the system in the network telephone device is unable to be updated or modified, thus brining challenges to the maintenance staff. Therefore, additional efforts are required to reduce the input/output connection ports while taking the design of the appearance of the network telephone device and the subsequent maintenance into consideration.

SUMMARY OF THE INVENTION

The invention provides a network telephone device, an external connection card, and a communication method for the network telephone device capable of transmitting signals compatible with a universal asynchronous receiver/transmitter (UART) interface through a wired network connector (e.g., an RJ45 connector), and the number of the input/output connection ports of the network telephone device is therefore reduced.

A network telephone device according to an embodiment of the invention includes a controller, a network connection port, a network transmission module and a relay. The controller is configured to process signals compatible with a universal asynchronous receiver/transmitter (UART) interface and includes a transmit node and a receive node. The network connection port includes a plurality of pins. The network transmission module is coupled to all or some of the pins of the network connection port. The relay is coupled between the controller and at least two of the pins of the network connection port. When a power supply mode of an external network cable connected to the network connection port is a first mode of powering over the Ethernet, the relay connects the transmit node and the receive node of the controller respectively to the at least two of the pins of the network connection port, and the controller and an external device connected to the external network cable transmit the signals compatible with the universal asynchronous receiver/transmitter interface to transmit data or instructions with each other through the at least two of the pins.

An external connection card according to an embodiment of the invention includes a network connection port, an isolation IC, and a console IC. The network connection port includes a plurality of pins connected to a network telephone device through an external network cable. The isolation IC is coupled to at least two of the pins of the network connection port and converts signals at the at least two of the pins into signals in a predetermined voltage range. The console IC is coupled to the isolation IC. The console IC is configured to convert the signals in the predetermined voltage range into signals compatible with a universal asynchronous receiver/transmitter (UART) interface, an external computer connected to the console IC is configured to access the signals compatible with the universal asynchronous receiver/transmitter interface and the external computer and the network telephone device transmit data or instructions with each other through the external connection card.

In a communication method for a network telephone device and an external device according to an embodiment of the invention, the network telephone device includes a controller processing signals compatible with a universal asynchronous receiver/transmitter interface and a network connection port. The communication method includes steps as follows: disposing a relay between the controller and at least two pins of the network connection port; determining whether a power supply mode of an external network cable connected to the network connection port is a first mode of powering over the Ethernet; and controlling the relay to respectively connect a transmit node and a receive node of the controller to the at least two pins of the network connection port when the power supply mode of the external network cable is the first mode of powering over the Ethernet, wherein the controller and an external device connected to the external network cable transmit the signals compatible with the universal asynchronous receiver/transmitter interface to transmit data or instructions with each other through the at least two pins.

Based on the above, in the network telephone device according to the embodiments of the disclosure, four lines (e.g., the first, second, third, and sixth pins) of the network connection port (e.g., the RJ45 port) are adopted for network transmission, whereas the other four lines (e.g., the fourth, fifth, seventh, and eighth pins) in the RJ45 port are adopted to transmit signals compatible with the UART protocol. Besides, to enable powering over the Ethernet (POE) with the RJ45 port in the network telephone device, the relay is disposed between the UART controller and the RJ45 port to prevent the voltage used in POE from accidentally damaging the UART controller. During maintenance of the network telephone device, the signals compatible with the UART protocol may be converted into signals compatible with the RS232 protocol through the external connection card. Accordingly, the external computer may obtain signals through a connection port compatible with the RS232 protocol, retrieve the information of the network telephone device, and send relevant instructions. The network telephone device according to the embodiments of the disclosure is thus able to transmit the signals compatible with the UART interface through the network connection port (the RJ45 port), and the number of the input/output connection ports is therefore reduced. Hence, a circuit and a connection port (e.g., a DB45 port or an RJ11 port) converting the UART interface into the RS232 interface are not required in the network telephone device, and the cost is consequently reduced.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
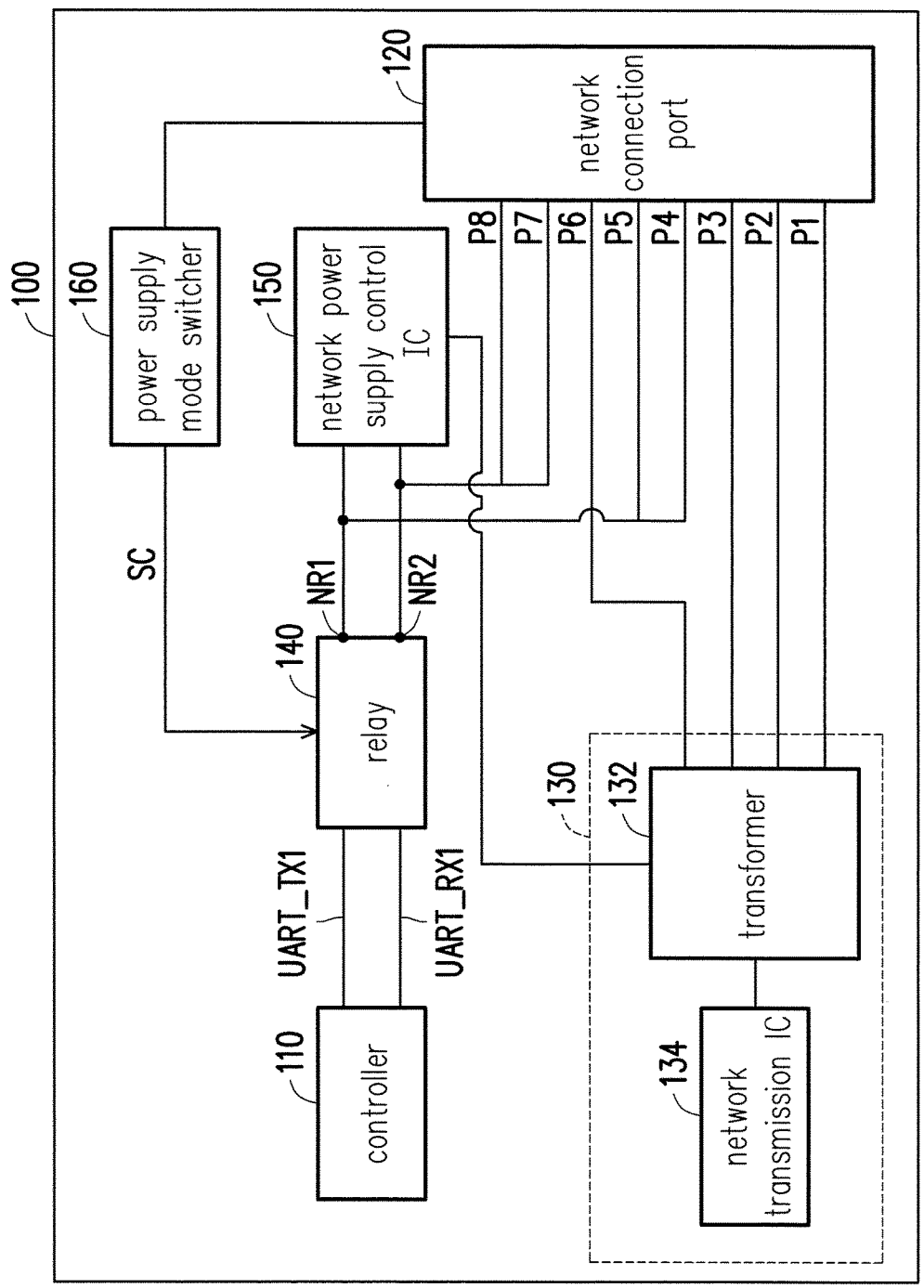
FIG. 1 is a block view illustrating a network telephone device according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

FIG. 1 is a block view illustrating a network telephone device 100 according to an embodiment of the disclosure. The network telephone device 100 may be a network telephone having a speaking tube and having a single network connection port 120, and may also be a network telephone converter having the single network connection port 120 and another connection interface (e.g., a USB interface). The network telephone device 100 mainly includes a controller 110, a network connection port 120, a network transmission module 130, and a relay 140. The controller 110 is configured to process signals compatible with a universal asynchronous receiver/transmitter (UART) interface. The controller 110 has a UART transmit node UART_TX1 and a UART receive node UART_RX1. The connection port 120 of the embodiment is an RJ45 connection port and includes eight pins P1 to P8. The network transmission module 130 mainly includes a transformer 132 and a network transmission IC 134. The transformer 132 of the embodiment is connected to the pins P1 to P3 and P6 of the network connection port 120. The network transmission IC 134 indirectly access signals at the pins P1 to P3 and P6 through the transformer 132 for network telephone communication.

The relay 140 is coupled between the controller 110 and at least two pins of the pins P1 to P8 of the network connection port 120. Specifically, a first connection node NR1 of the relay 140 is connected to the fourth pin P4 and the fifth pin P5 of the network transmission port 120. A second connection port NR2 of the relay 140 is connected to the seventh pin P7 and the eighth pin P8 of the network transmission port 120. The relay 140 is connected to the fourth pin P4, the fifth pin P5, the seventh pin P7, and the eighth pin P8 of the network connection port 120 because these pins are not used for network transmission when the type of the Ethernet is 100BASE-T or 10BASE-T. Therefore, in the embodiment of the disclosure, these pins are adopted for the controller 110 to transmit the signals compatible with the UART interface to an external electronic device (e.g., an external connection card and an external device in the embodiment of the disclosure as described subsequently) connected to the network connection port 120, so as to communicate with each other. Those adopting the embodiment may adjust the first connection node NR1 and the second connection node NR2 of the relay 140 to connect to other pins of the network connection port 120 based on needs. Alternatively, the first connection node NR1 may be connected to the fourth pin P4 or the fifth pin P5 only, and the second connection node NR2 may be connected to the seventh pin P7 or the eighth pin P8 only. Of course, if the first connection node NR1 is connected to the fourth pin P4 or the fifth pin P5 only, and the second connection node NR2 is connected to the seventh node P7 or the eighth node P8 only, the corresponding pin of the network connection port connected to the isolation IC needs to be adaptively adjusted for the external connection card described in the following with reference to FIG. 2.

Normally, when the network telephone device 100 operates normally, the network telephone device 100 transmits data to and from an external network through the pins P1 to P3 and P6 of the network connection port 120 for network telephone communication. In other words, the network transmission module 130 carries out Ethernet transmission by using the pins P1 to P3 and P6 in the network connection port 120, the type of the Ethernet protocol is 100BASE-T or 10BASE-T, and an upper limit of data transmission of such Ethernet protocol is 100 Mbps. It should be noted that the network telephone device 100 of the embodiment is incompatible with an Ethernet protocol whose upper limit of data transmission is 1000 Mbps (e.g., the type of the Ethernet is 1000BASE-T, 1000BASE-TX, etc.), because such Ethernet protocol requires all (eight) of the pins of the network connection port 120 for network data transmission, and the network connection port 120 thus does not have pins available to transmit the signals compatible with the UART interface. In such case, the embodiment of the disclosure is unable to be carried out.

The network telephone device 100 further includes a network power supply IC 150 and a power supply mode switcher 160. The network power supply control IC 150 is configured to carry out powering over the Ethernet (POE), where power required by the network telephone device 100 is obtained through the external network cable coupled to the network connection port 120. Currently, POE requires a voltage of 36V to 57V to transmit power. Therefore, if improperly connected, the controller 110 may be damaged due to being directly subjected to an overly high voltage. In the embodiment, powering over the Ethernet (POE) includes two modes. In the first mode (also referred to as the first mode MODE_A), the pins P1 to P3 and P6 of the network connection port 120 transmit power, whereas in the other mode (also referred to as a second mode MODE_B), the pins P4, P5, and P7, and P8 of the network connection port 120 transmit power. However, if an external power supply device connected to the network connection port 120 supplies power in MODE_B, the controller 110 may be directly damaged in absence of the protection of the relay 140.

Therefore, in the embodiment of the disclosure, the power supply mode switcher 160 serves to determine whether the POE adopted by the external power supply device is in the first mode (MODE_A) or the second mode (MODE_B). If the external device connected to the network connection port 120 through the external network cable is not capable of powering over the Ethernet, the network telephone device 100 is powered by another device, and the network connection port 120 is not connected to a network cable specifically for a network telephone. In other words, the network connection port 120 is connected to the external connection card through an external network cable incapable of powering over the Ethernet, and the relay 140 may connect the transmit node UART_TX1 of the controller to the fourth pin P4 and the fifth pin P5 of the network connection port 120 through the first connection node NR1, and connect the receive node UART_RX1 of the controller to the seventh pin P7 and the eighth pin P8 of the network connection port 120 through the second connection node NR2. Under the circumstance, the controller 110 and the external device (e.g., an external connection card or an external computer) connected to the external network cable may transmit signals compatible with the UART interface through the pins P4, P5, P7, and P8 to transmit data or instructions with each other. Since the network telephone device 100 of the device is not designed with an additional power reception path, it is difficult for the power supply mode switcher 160 to detect that the external device connected to the network connection port 120 through the external network cable is incapable of powering over the Ethernet.

In the case that the external device connected to the network connection port 120 through the external network cable is capable of powering over the Ethernet, and the power supply mode of the POE of the external device is the first mode MODE_A of POE, since power is transmitted through the pins P1 to P3 and P6 of the network connection port 120 in the first mode MODE_A, the controller 110 is neither directly nor indirectly connected. Thus, the relay 140 still connects the transmit node UART_TX1 of the controller to the fourth pin P4 and the fifth pin P5 of the network connection port 120, and the receive node UART_RX1 of the controller is connected to the seventh pin P7 and the eight pin P8 of the network connection port 120. Under the circumstance, the controller 110 and the external device connected to the external network cable may transmit signals compatible with the UART interface through the pins P4, P5, P7, and P8 to transmit data or instructions with each other.

In the case that the external device connected to the network connection port 120 through the external network cable is capable of powering over the Ethernet, and the power supply mode of the POE of the external device is not the first mode MODE_A of POE but the second mode MODE_B, the power supply mode switcher 160 may transmit a control signal SC to the relay 140, and the relay 140 may disconnect the transmit node UART_TX1 and the receive node UART_RX1 of the controller 110 from the pins P4, P5, P7, and P8 of the network connection port. Under the circumstance, as the controller 110 is disconnected from the network connection port 120, the controller 110 is unable to communicate with the external device through the signals compatible the UART interface.

Figure 2:
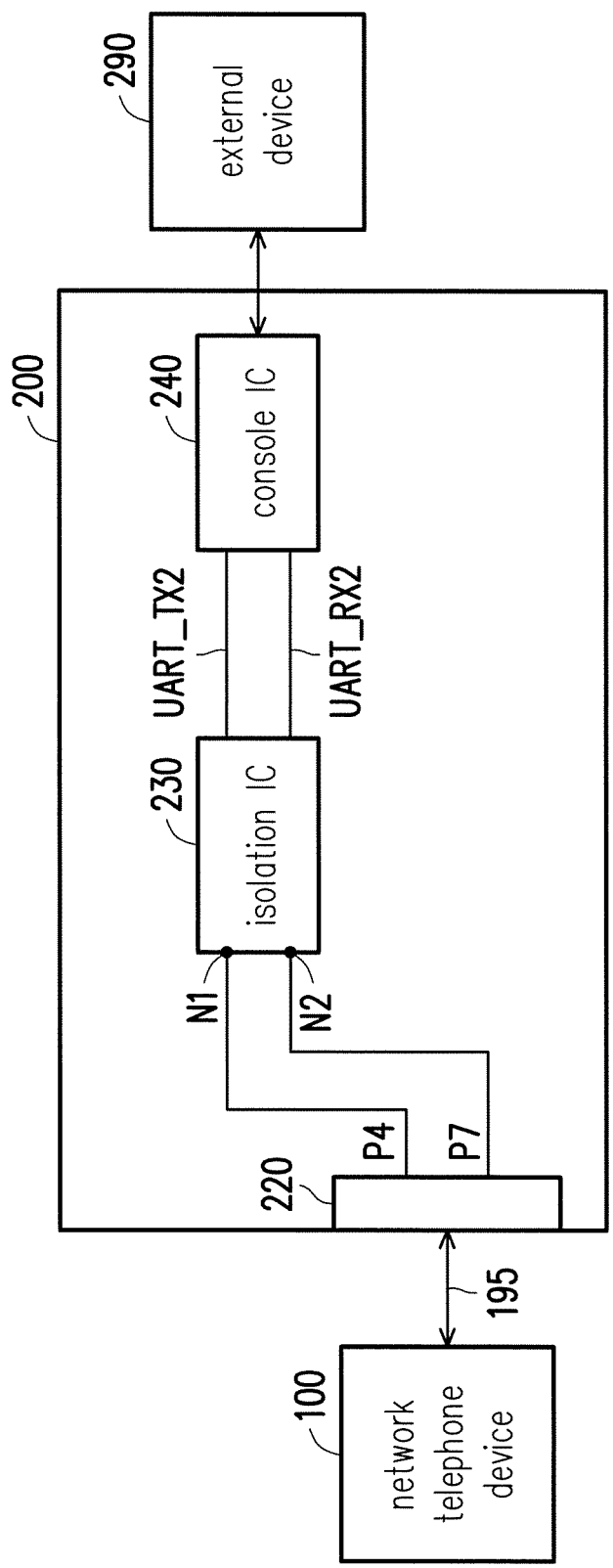
FIG. 2 is a block view illustrating a network telephone device, an external connection card, and an external device according to an embodiment of the disclosure.

FIG. 2 is a block view illustrating the network telephone device, an external connection card 200, and an external device 290 according to an embodiment of the disclosure. The network telephone device 100 shown in FIG. 2 is the same as the network telephone device shown in FIG. 1. Normally, the network telephone device 100 may be connected to the external network through the external network cable for network telephone communication. However, if the system of the network telephone device 100 is found erroneous and requires maintenance or a firmware update, the external connection card 200 is disposed in the embodiment of the disclosure for the network telephone device 100 to be connected to the external device 290 through the external network cable 195. Thus, the external device 290 may retrieve system information in the network telephone device 100 or transmit an instruction to update the firmware. The external device 290 may be a computer or a firmware update server. In the embodiment, the external device 290 may transmit data through an RS232 interface and a relevant physical connection port (e.g., a DB-25 port or an RJ11 port).

The external connection card 200 of the embodiment includes a network connection port 220, an isolation IC 230, and a console IC 240. The network connection port 220 includes a plurality of pins. The pins may be connected to the network telephone device 100 through the external network cable 195. The isolation IC 230 is coupled to at least two of the pins of the network connection port 220 (e.g., connected to the fourth pin P4 and the seventh pin P7), and converts signals at the at least two pins into signals in a predetermined voltage range. For example, the isolation IC 230 converts the signal at the fourth pin P4 of the network connection port 220 into a signal in the predetermined voltage range and transmits the signal to a UART transmit node UART_TX2 of the console IC 240, and the isolation IC 230 converts the signal at the seventh pin P7 of the network connection port 220 into a signal in the predetermined voltage and transmits the signal to a UART receive node UART_RX2 of the console IC 240. In the network telephone device 100, the fourth pin P4 of the network connection port 220 is connected to the UART transmit node UART_TX1 of the controller 110, and the seventh pin P7 of the network connection port 220 is connected to the UART receive node UART_RX1 of the controller 110. In other words, the console IC 240 is coupled to the isolation IC 230 through the UART transmit node UART_TX2 and the UART receive node UART_RX2.

The external connection card 200 may supply power to the network telephone device 100 in the first mode MODE_A. Accordingly, the network telephone device 100 is supplied with power and turned on. Thus, the console IC 240 may convert the signals in the predetermined voltage range into signals compatible with the UART interface. The external device 290 (e.g., a computer) connected to the console IC 240 is consequently able to access the signals compatible with the UART interface, and the external device 290 and the controller 110 in the network telephone device 100 may transmit data or instructions through the external connection card 200 and the pins P4 and P7 in the network connection ports 120 and 220.

In some embodiments, a first connection node N1 of the isolation IC 230 may be coupled to the fourth pin P4 or the fifth pin P5 of the network connection port 220 or coupled to the fourth pin P4 and the fifth pin P5. A second connection node N2 of the isolation IC 230 may be coupled to the seventh pin P7 or the eighth pin P8 of the network connection port 230 or coupled to the seventh pin P7 and the eighth pin P8, depending on the needs of those adopting the embodiment and the connection between the relay 140 of the network telephone device 100 and the pins of the network connection port 120.

Figure 3:
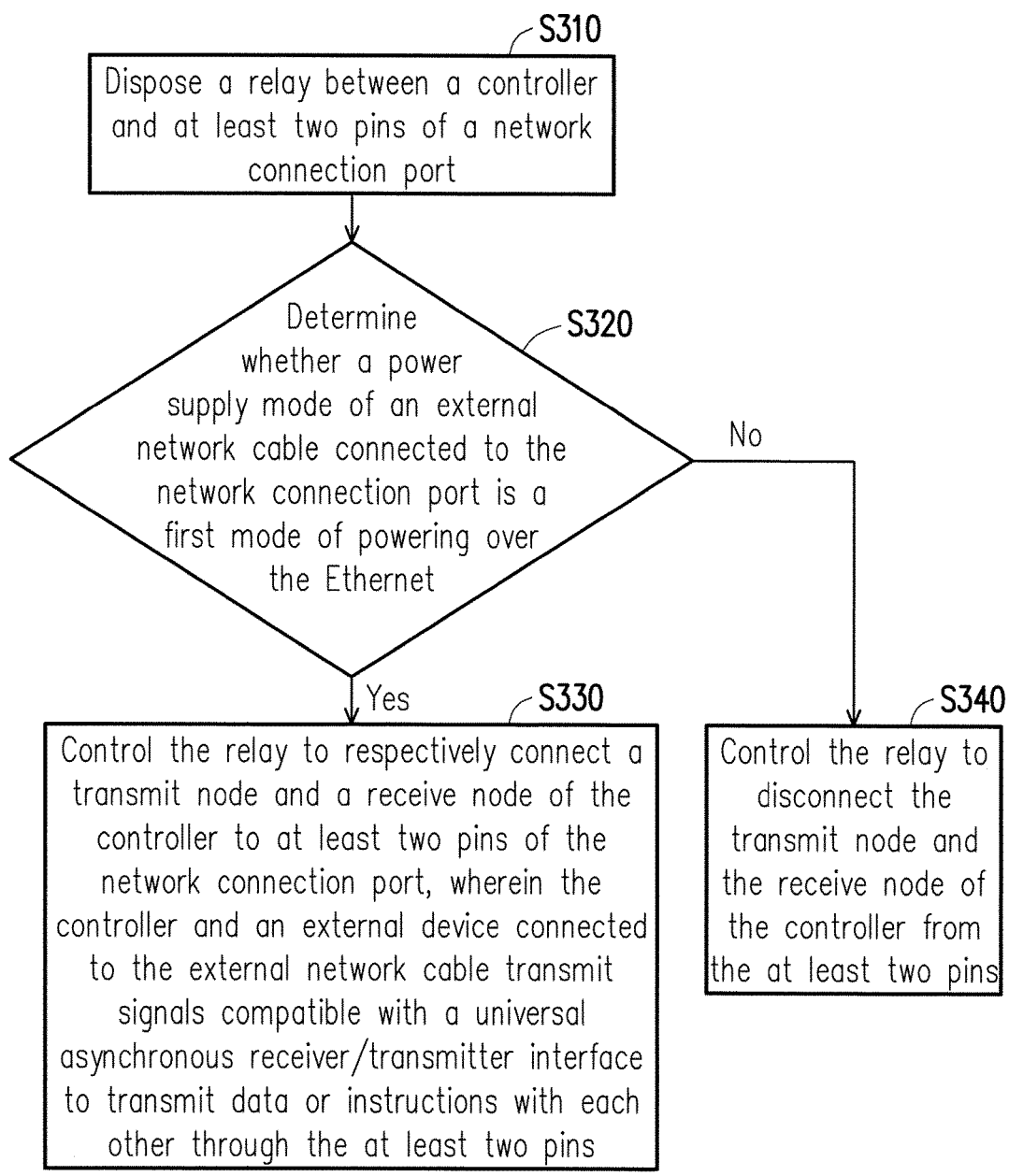
FIG. 3 is a flowchart illustrating a communication method for a network telephone device and an external device according to an embodiment of the disclosure.

FIG. 3 is a flowchart illustrating a communication method for the network telephone device 100 and the external device 290 according to an embodiment of the disclosure. The communication method shown in FIG. 3 is described with reference to the respective components of FIG. 2. At Step S310, the relay 140 is disposed between the controller 110 of the network telephone device 100 and at least two of the pins of the network connection port 120. At Step S320, the power supply mode switcher 160 determines whether the power supply mode of the external network cable connected to the network connection port 120 is the first mode MODE_A of POE. If the power supply mode of the external network cable is the first mode MODE_A of POE, Step S330 is performed after Step S320. At Step S330, the relay 140 is controlled to respectively connect the transmit node UART_TX1 and the receive node UART_RX1 of the controller to at least two pins (e.g., pins P4, P5, P7, and P8) of the network connection port 120. Accordingly, the controller 110 and the external device 290 connected to the external network cable 190 may transmit signals compatible with the UART interface to transmit data or instructions with each other through the at least two pins (pins P4, P5, P7, and P8). Comparatively, if the power supply node of the external network cable is not the first mode MODE_A of POE, but the second mode MODE_B, the relay 140 is controlled to disconnect the transmit node UART_TX1 and the receive node UART_TX2 of the controller from the at least two pins of the network connection cable 120.

In view of the foregoing, in the network telephone device according to the embodiments of the disclosure, four lines (e.g., the first, second, third, and sixth pins) of the RJ45 port are adopted for network transmission, whereas the other four lines (e.g., the fourth, fifth, seventh, and eighth pins) in the RJ45 port are adopted to transmit signals compatible with the UART protocol. Besides, to enable powering over the Ethernet (POE) with the RJ45 port in the network telephone device, the relay is disposed between the UART controller and the RJ45 port to prevent the voltage used in POE from accidentally damaging the UART controller. During maintenance of the network telephone device, the signals compatible with the UART protocol may be converted into signals compatible with the RS232 protocol through the external connection card. Accordingly, the external computer may obtain signals through a connection port compatible with the RS232 protocol, retrieve the information of the network telephone device, and send relevant instructions. The network telephone device according to the embodiments of the disclosure is thus able to transmit the signals compatible with the UART interface through a wired network connector (the RJ45 connector), and the number of the input/output connection ports is therefore reduced. Hence, a circuit and a connection port (e.g., an RJ11 connection port) converting the UART interface into the RS232 interface are not required in the network telephone device, and the cost is consequently reduced.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A network telephone device, comprising:
   a controller, configured to process signals compatible with a universal asynchronous receiver/transmitter interface and comprising a transmit node and a receive node;
   a network connection port, comprising a plurality of pins;
   a network transmission module, coupled to all or some of the pins of the network connection port; and
   a relay, coupled between the controller and at least two of the pins of the network connection port,
   wherein when a power supply mode of an external network cable connected to the network connection port is a first mode of powering over the Ethernet, the relay connects the transmit node and the receive node of the controller respectively to the at least two of the pins of the network connection port, and the controller and an external device connected to the external network cable transmit the signals compatible with the universal asynchronous receiver/transmitter interface to transmit data or instructions with each other through the at least two of the pins.

2. The network telephone device as claimed in claim 1, wherein the network transmission module performs Ethernet transmission with four of the pins of the network connection port, and a type of the Ethernet is 100BASE-T or 10BASE-T.

3. The network telephone device as claimed in claim 1, wherein the relay is connected to a fourth pin, a fifth pin, a seventh pin, and an eighth pin of the network connection port,
   when the external network cable connected to the network connection port is incapable of supplying power over the Ethernet or the power supply mode of the external network cable is the first mode of powering over the Ethernet, the relay connects the transmit node of the controller to the fourth pin and the fifth pin of the network connection port, and connects the receive node of the controller to the seventh pin and the eighth pin of the network connection port.

4. The network telephone device as claimed in claim 1, further comprising:
   a power supply mode switcher, coupled to the network connection port to determine whether the power supply mode of the external network cable is the first mode of powering over the Ethernet,
   when the power supply mode switcher determines that the power supply mode of the external network cable is not the first mode of powering over the Ethernet, a control signal is transmitted to the relay to disconnect the transmit node and the receive node of the controller from the at least two of the pins.

5. The network telephone device as claimed in claim 1, wherein the network transmission module comprises:
   a transformer, coupled to a first pin, a second pin, a third pin, and a sixth pin of the network connection port; and
   a network transmission IC, performing network telephone communication through signals at the first pin, the second pin, the third pin, and the sixth pin of the network connection port provided by the transformer.

6. The network telephone device as claimed in claim 5, further comprising:

a network power supply control IC, supplied with power by the external network cable connected to the network connection port to supply power to the network telephone device.

7. An external connection card, comprising
a network connection port, comprising a plurality of pins connected to a network telephone device through an external network cable;
an isolation IC, coupled to at least two of the pins of the network connection port and converting signals at the at least two of the pins into signals in a predetermined voltage range; and
a console IC, coupled to the isolation IC and configured to convert the signals in the predetermined voltage range into signals compatible with a universal asynchronous receiver/transmitter (UART) interface in response to a power supply mode of an external network cable connected to the network connection port is a first mode of powering over the Ethernet, wherein an external computer connected to the console IC is configured to access the signals compatible with the universal asynchronous receiver/transmitter interface and the external computer and the network telephone device transmit data or instructions with each other through the external connection card.

8. The external connection card as claimed in claim 7, wherein a first connection node of the isolation IC is coupled to a fourth pin or a fifth pin of the network connection port or is coupled to the fourth pin and the fifth pin, and a second connection node of the isolation IC is coupled to a seventh pin or an eighth pin of the network connection port or is coupled to the seventh pin and the eighth pin.

9. A communication method for a network telephone device and an external device, wherein the network telephone device comprises a controller processing signal compatible with a universal asynchronous receiver/transmitter interface and a network connection port, the communication method comprising:

disposing a relay between the controller and at least two pins of the network connection port;

determining whether a power supply mode of an external network cable connected to the network connection port is a first mode of powering over the Ethernet; and controlling the relay to respectively connect a transmit node and a receive node of the controller to the at least two pins of the network connection port when the power supply mode of the external network cable is the first mode of powering over the Ethernet, wherein the controller and an external device connected to the external network cable transmit the signals compatible with the universal asynchronous receiver/transmitter interface to transmit data or instructions with each other through the at least two pins.

10. The communication method as claimed in claim 9, further comprising:

controlling the relay to disconnect the transmit node and the receive node of the controller from the at least two pins when the external network cable is capable of supplying power over the Ethernet and the power supply mode of the external network cable is not the first node of powering over the Ethernet.

* * * * *